June 26, 1951   E. M. FRANKEL   2,558,515
HYDROLYSIS OF ESTERS
Filed Dec. 17, 1948
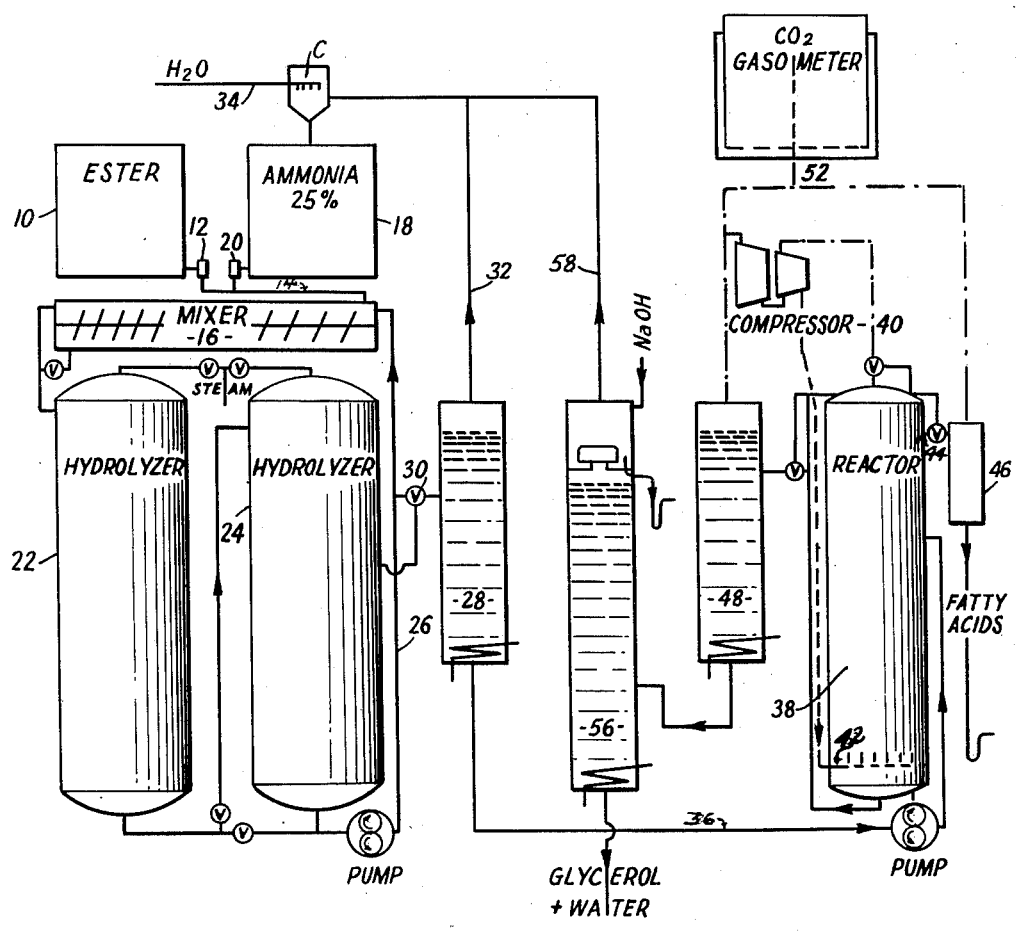
INVENTOR.
EDWARD M FRANKEL
BY
ATTORNEY.

Patented June 26, 1951

2,558,515

UNITED STATES PATENT OFFICE 2,558,515

HYDROLYSIS OF ESTERS

Edward M. Frankel, Grand View, N. Y.

Application December 17, 1948, Serial No. 65,941

9 Claims. (Cl. 260—415)

This invention relates to processes for the conversion of fats and oils into fatty acids and glycerine, and in particular is directed to a novel continuous process for the hydrolysis of the glyceride esters of fatty acids and other esters.

Oil and fats are normally hydrolyzed by water at high pressure and high temperatures or by catalyzing the action of water at lower temperatures and pressures in the presence of an acid (the Twichell process), or alkaline catalysts as, for example, zinc oxide.

All of the above methods and systems require special equipment designed to resist high pressures and temperatures as well as corrosion when corrosion producing catalysts are used, as in the Twichell process and the like.

The invention disclosed herein has for its principal object the accomplishment of the same results as those of the prior processes but more completely at lower temperatures and pressures. My novel process can, for the major part, be conducted in vessels of mild steel.

A further object is the provision of a more economical process for the hydrolysis of fats and oils than has heretofore been possible.

A further object of this invention is the provision of a continuous process for the hydrolysis of fats and oils which may be carried out by the use of relatively simple equipment and, therefore, the process may be utilized by smaller manufacturers.

The foregoing objects, as well as other objects and advantages which will become apparent from the more detailed description, depend upon the fact that the fundamental reactions employed in carrying out the process of this invention are:

1. Hydrolysis of the oil or fat with aqueous ammonia to yield glycerol and the ammonia salts of fatty acids.
2. Acidification of the ammonium salts (soaps) thus produced with carbon dioxide to liberate the fatty acids from the aqueous phase and the retention of the ammonia in aqueous solution as ammonium bicarbonate.
3. Treatment of the aqueous solution of ammonium bicarbonate separately to regenerate free carbon dioxide and free ammonia for recycling in the system.
4. Recovery of the glycerol from the aqueous solution thereof as produced in the course of the process in a high state of purity.

The basic principles of operation rely on the fact that after the ammonium salts of the fatty acids as, for example, the ammonium soaps are produced and conveyed in aqueous medium, the salts are then subjected to the action of carbon dioxide under pressure. By this operation the carbon dioxide converts the soap into fatty acids and ammonium bicarbonate. Since the pH of the ammonium bicarbonate solution saturated with carbon dioxide is less than the pH of the solution of the fatty acids in water, the acids are released with resultant stratification of the water and the insoluble fatty acids into two layers, the fatty acid floating on top of the aqueous layer with its dissolved glycerine. The layer of the fatty acids may then be readily removed.

An illustrative system for carrying into operation the process of this invention is illustrated in the accompanying drawing.

Liquid fat or oil, contained in tank 10, is moved by pump 12 (feeding at a rate of about 6 gallons per minute), through line 14, to a mixing vessel 16. In line 14, the stream of fat contacts a flow of aqueous ammonia (25%), fed thereto from the ammonia storage tank 18, through pump 20, operating at the rate of about 2 gallons per minute, together with a substantial quantity of the completely saponified fat, the latter being added to facilitate the emulsification of the fat. After passing through the mixer 16, the emulsion of fat and ammonia is delivered to vessel 22, in which the saponification is carried on at a pressure of 100 p. s. i. at a temperature of 300° F. In order to provide for the completion of the saponification at this stage, the effluent from vessel 22, may be passed into vessel 24, where the liquid is subjected to the same temperature and pressure as in vessel 22. A supply of steam enters each of the vessels 22 and 24, as indicated on the drawing.

The completely saponified material is then pumped through line 26, from which a portion is recycled through the mixer 16, and the rest delivered to the distilling column 28, where the surplus of ammonia is distilled off by the addition of heat at the base of this column. The level in vessel 24 is held constant by regulation of draw-off valve 30, by means of a level controller. The flashed off ammonia is fed back into the ammonia storage tank through line 32, where it is absorbed by a current of water entering through line 34. The water normally introduced at 34 may be substituted with aqueous glycerol ultimately recovered in the process as hereinafter described, thus reducing the necessity for the ultimate evaporation of fresh water added. It is obvious that only a portion of the effluent from column 56 can so be employed, the rest constituting one of the end products of the process. The use of dilute glycerol instead of water at this point will raise the boiling point of the mixture and thus reduce the pressure in the hydrolysis vessels.

The soap solution cascades to the bottom of column 28, from which point it is delivered through line 36, to the reactor 38, in which it is subjected to the action of carbon dioxide at a pressure of about 100 p. s. i. The carbon dioxide is delivered to reactor 38, from the compressor 40, through the sparger 42. The carbon dioxide decomposes the soap into fatty acid and the released ammonia is converted into ammonium bicarbonate. Since the pH of the ammonium bicarbonate saturated with carbon dioxide is lower than the pH of the solution of the fatty acids in water, the fatty acids are released and float to the top, from which point they are removed through pipe 44, passing through a separator 46, and thence to the fatty acid storage tank. The aqueous layer, in the reactor, which contains the glycerol and ammonium bicarbonate, is conveyed to distilling column 48, wherein this aqueous solution is subjected to the action of heat with the evolution of carbon dioxide substantially free of ammonia. The carbon dioxide thus regenerated is fed back through line 52, to the recovered carbon dioxide storage gasometer, from which it may be fed back to the compressor 40, for reuse in the reactor. The liquid effluent from column 48, is fed to distilling column 56, where the ammonia is stripped by heating the liquid at the base of the column with resultant release of ammonia. The liberated ammonia emerging at the head of column 56, is recovered through line 58, which is connected with line 32.

The aqueous glycerol effluent from column 56, may be concentrated or refined in the conventional manner or, if desired, the aqueous glycerol solution from the base of column 56 may be passed through ion exchange apparatus to remove traces of cations or anions that may have originated in the raw materials or from imperfect operation of the distilling column or have been added as promoter catalysts at some stage of the operation, notably if, as hereinafter described, di-glycerides and/or mono-glycerides are used in the process, and such glycerides are produced by interesterification using sodium methylate or the like. Further refining is facilitated by the fact that the glycerol is free from non-volatile salts and produces a better grade of finished product, which may be used in some arts even without further distillation as, for example, for the production of alkyd resins, antifreeze solutions, etc. A portion of the aqueous glycerol emerging from column 56 may be used as substitute for the water entering at line 34.

The fatty acids recovered contain no unconverted fat, and lend themselves more readily to purification by distillation, solution, or other appropriate treatment.

If it be desired to scrub the ammonia of the carbon dioxide prior to its return to the ammonia storage tank, the same may be accomplished by washing it with a solution of sodium hydroxide. The separation of the carbon dioxide need not be too sharp, since it is fed back into the ammoniacal solution resulting from the original saponification.

It will be observed that the apparatus used in carrying out this novel process presents great advantages by reason of its simplicity of construction and economies in initial cost, which arise from the fact that all the parts, except the reactor, are made of mild steel, and even the reactor, which may be made of stainless steel or clad metal, does not have to withstand high pressures and, accordingly, can be made of large capacity or lighter weight metal. This invention, therefore, makes it possible drastically to reduce the installation cost for the apparatus used to effectuate the process.

Since the operation takes place at relatively low temperatures (less than 300° F.) there is no requirement for high pressure boilers or the cost of producing high temperature and high pressure steam. Since the units are relatively small, they can easily be used and do not require special construction needed in high pressure processes. Due to the rapidity of the reactions, the through-put of a given unit is relatively large per unit of investment cost.

The process hereinabove described may be modified as follows:

Glycerine from any source, but preferably that obtained by recycling from this saponification process, is heated with the tri-glyceride (fat) to convert the latter into a mixture of diglycerides and mono-glycerides until a water miscible product is obtained. This water miscible product is now introduced into the system through the mixer 16, in place of the tri-glyceride. The saponification of the mono-glycerides and di-glycerides proceeds more rapidly than that of the tri-glycerides by virtue of their enhanced solubility. A further modification is that of introducing the mono-glycerides and/or the di-glycerides into the mixer 16, together with a stream of the tri-glycerides. This procedure results in the enhanced solubility or emulsification of the tri-glycerides by virtue of the action of the mono-glycerides and di-glycerides.

It will be understood that the foregoing description is but illustrative of the manner in which this invention may be practiced and, accordingly, the appended claims are to be construed as defining the invention within the full spirit and scope thereof.

I claim:

1. A continuous process for the hydrolysis of glycerides of higher fatty acids and separation of their components which comprises, mixing said glycerides with aqueous ammonia in excess of the molar quantity required for complete saponification, subjecting said mixture to an elevated temperature but not substantially in excess of 300° F. and at super-atmospheric pressure but not substantially in excess of 100 p. s. i. thereby to produce a solution of the ammonium salts of said fatty acids and glycerol, subjecting said solution to the action of carbon dioxide at super-atmospheric pressure but not substantially in excess of 100 p. s. i. thereby to produce a solution containing ammonium bicarbonate and glycerol mixed with free fatty solids, and separating the free fatty acids therefrom, heating said solution, after removal of the free fatty acids, to produce gaseous carbon dioxide, removing said gaseous carbon dioxide thereby to produce an aqueous solution of glycerol and ammonia and heating said ammoniacal solution to remove the ammonia therefrom thereby to produce an ammonia-free aqueous solution of glycerol.

2. A continuous process for the hydrolysis of triglycerides of higher fatty acids and separation of their components which comprises, mixing said triglycerides with aqueous ammonia in excess of the molar quantity required for complete saponification, subjecting said mixture to an elevated temperature but not substantially in excess of 300° F. and at super-atmospheric pressure but not substantially in excess of 100 p. s. i. thereby to produce a solution of the ammonium salts of said fatty acids and glycerol, subjecting said solution to the action of carbon dioxide at super-atmohpheric pressure but not substantially in excess of 100 p. s. i. thereby to produce a solution containing ammonium bicarbonate and glycerol mixed with free fatty acids, and separating the free fatty acids therefrom, heating said solution, after removal of the free fatty acids, to produce gaseous carbon dioxide, removing said gaseous carbon dioxide thereby to produce an aqueous solution of glycerol and ammonia and heating said ammoniacal solution to remove the ammonia therefrom thereby to produce an ammonia-free aqueous solution of glycerol.

3. Process in accordance with claim 2, including the step of distilling off the excess of ammonia from the solution of the ammonium salts of the fatty acids and glycerol prior to the reaction thereof with carbon dioxide.

4. A continuous process for the hydrolysis of triglycerides of higher fatty acids and separation of their components which comprises, mixing said triglycerides with aqueous ammonia in excess of the molar quantity required for complete saponification, subjecting said mixture to a temperature of about 300° F. and at super-atmospheric pressure but not substantially in excess of 100 p. s. i. thereby to produce a solution of the ammonium salts of said fatty acids and glycerol, subjecting said solution to the action of carbon dioxide at super-atmospheric pressure but not substantially in excess of 100 p. s. i. thereby to produce a solution containing ammonium bicarbonate and glycerol mixed with free fatty acids, and separating the free fatty acids therefrom, heating said solution, after removal of the free fatty acids, to produce gaseous carbon dioxide, removing said gaseous carbon dioxide thereby to produce an aqueous solution of glycerol and ammonia and heating said ammonical solution to remove the ammonia therefrom thereby to produce an ammonia-free aqueous solution of glycerol.

5. A continuous process for the hydrolysis of triglycerides of higher fatty acids and separation of their components which comprises, mixing said triglycerides with aqueous ammonia in excess of the molar quantity required for complete saponification, subjecting said mixture to a temperature of about 300, F. and at a pressure of about 100 p. s. i. thereby to produce a solution of the ammonium salts of said fatty acids and glycerol, subjecting said solution to the action of carbon dioxide at super-atmospheric pressure but not substantially in excess of 100 p. s. i. thereby to produce a solution containing ammonium bicarbonate and glycerol mixed with free fatty acids, and separating the free fatty acids therefrom, heating said solution, after removal of the free fatty acids, to produce gaseous carbon dioxide, removing said gaseous carbon dioxide thereby to produce an aqueous solution of glycerol and ammonia and heating said ammoniacal solution to remove the ammonia therefrom thereby to produce an ammonia-free aqueous solution of glycerol.

6. A continuous process for the hydrolysis of triglycerides of higher fatty acids and separation of their components which comprises, mixing said triglycerides with aqueous ammonia in excess of the molar quantity required for complete saponification, subjecting said mixture to a temperature of about 300° F. at a pressure of about 100 p. s. i. thereby to produce a solution of the ammonium salts of said fatty acids and glycerol, subjecting said solution to the action of carbon dioxide at super-atmospheric pressure to a pressure of about 100 p. s. i. thereby to produce a solution containing ammonium bicarbonate and glycerol mixed with free fatty acids, and separating the free fatty acids therefrom, heating said solution, after removal of the free fatty acids, to produce gaseous carbon dioxide, removing said gaseous carbon dioxide thereby to produce an aqueous solution of glycerol and ammonia and heating said ammoniacal solution to remove the ammonia therefrom thereby to produce an ammonia-free aqueous solution of glycerol.

7. A continuous process for the hydrolysis of triglycerides of higher fatty acids and separation of their components which comprises, mixing said triglycerides with aqueous ammonia in excess of the molar quantity required for complete saponification, subjecting said mixture to an elevated temperature but not substantially in excess of 300° F. and at super-atmospheric pressure but not substantially in excess of 100 p. s. i. thereby to produce a solution of the ammonium salts of said fatty acids and glycerol, subjecting said solution to the action of carbon dioxide at super-atmospheric pressure but not substantially in excess of 100 p. s. i. thereby to produce a solution containing ammonium bicarbonate and glycerol mixed with free fatty acids, and separating the free fatty acids therefrom, heating said solution, after removal of the free fatty acids, to produce gaseous carbon dioxide, removing said gaseous carbon dioxide thereby to produce an aqueous solution of glycerol and ammonia, heating said ammoniacal solution to remove the ammonia therefrom thereby to produce an ammonia-free aqueous solution of glycerol, removing the water from said ammonia-free solution of glycerol to produce concentrated glycerol, reacting said concentrated glycerol with triglycerides of higher fatty acids to produce superglycerinated compounds thereof, and mixing said superglycerinated compounds with the mixture of triglycerides and the aqueous ammonia in the initial state of the process.

8. Process in accordance with claim 7 including the step of distilling off the excess of ammonia from the solution of the ammonium salts of the fatty acids and glycerol prior to the reaction thereof with carbon dioxide.

9. A continuous process for the hydrolysis of triglycerides of higher fatty acids and separation of their components which comprises, mixing said triglycerides with aqueous ammonia in excess of the molar quantity required for complete saponification, subjecting said mixture to an elevated temperature but not substantially in excess of 300° F. and at super-atmospheric pressure but not substantially in excess of 100 p. s. i. thereby to produce a solution of the ammonium salts of said fatty acids and glycerol, subjecting said solution to the action of carbon dioxide at super-atmospheric pressure but not substantially in excess of 100 p. s. i. thereby to produce a solution containing ammonium bicarbonate and glycerol mixed with free fatty acids, and separating the free fatty acids therefrom, heating said solution, after removal of the free fatty acids, to produce gaseous carbon dioxide, removing said gaseous carbon dioxide thereby to produce an aqueous solution of glycerol and ammonia, heating said ammoniacal solution to remove the ammonia therefrom thereby to produce an ammonia-free aqueous solution of glycerol, and removing cations and anions contained in said last solution of glycerol by the action of ion exchange compounds.

EDWARD M. FRANKEL.

REFERENCES CITED

The following references are of record in the file of this patent:

FOREIGN PATENTS

| Number | Country | Date |
|---|---|---|
| 4,733 of 1882 | Great Britain | Oct. 4, 1882 |
| 12,210 of 1907 | Great Britain | Apr. 16, 1908 |
| 9,758 of 1908 | Great Britain | May 5, 1909 |